(12) United States Patent
Koschitzky

(10) Patent No.: US 7,048,990 B2
(45) Date of Patent: May 23, 2006

(54) DUAL LAYER SHINGLE

(75) Inventor: Henry Koschitzky, Downsview (CA)

(73) Assignee: IKO Industries Ltd., Toronto (CA)

( * ) Notice: Subject to any disclaimer, the term of this patent is extended or adjusted under 35 U.S.C. 154(b) by 0 days.

(21) Appl. No.: 10/739,164

(22) Filed: Dec. 19, 2003

(65) Prior Publication Data
US 2005/0144868 A1 Jul. 7, 2005

(51) Int. Cl.
E04D 1/22 (2006.01)
E04D 5/10 (2006.01)
B32B 11/00 (2006.01)

(52) U.S. Cl. ............... 428/144; 428/141; 52/518; 52/559

(58) Field of Classification Search ............ 52/518; 428/516, 517, 489, 493, 141
See application file for complete search history.

(56) References Cited

U.S. PATENT DOCUMENTS

| | | | | |
|---|---|---|---|---|
| 2,000,030 A | * | 5/1935 | Knapp ..................... 52/555 |
| 3,180,783 A | * | 4/1965 | Walker et al. ............ 428/148 |
| 3,332,830 A | * | 7/1967 | Tomlinson et al. ....... 428/190 |
| 3,547,674 A | * | 12/1970 | Gagle et al. .............. 442/123 |
| 3,931,440 A | * | 1/1976 | Shepherd et al. .......... 442/136 |
| 4,039,706 A | * | 8/1977 | Tajima et al. ............ 428/40.3 |
| 4,399,186 A | * | 8/1983 | Lauderback .............. 442/374 |
| 4,405,680 A | * | 9/1983 | Hansen .................... 442/180 |
| 4,871,605 A | * | 10/1989 | Pagen et al. .............. 428/141 |
| 4,878,950 A | * | 11/1989 | Halasz et al. ........... 106/273.1 |
| 5,195,290 A | * | 3/1993 | Hulett ...................... 52/518 |
| 5,347,785 A | * | 9/1994 | Terrenzio et al. ......... 52/555 |
| 5,488,807 A | * | 2/1996 | Terrenzio et al. ......... 52/555 |
| 5,865,003 A | * | 2/1999 | Klett et al. ................ 52/518 |
| 5,914,172 A | * | 6/1999 | Kiser ....................... 428/143 |
| 6,228,785 B1 | * | 5/2001 | Miller et al. .............. 442/148 |
| 6,296,912 B1 | * | 10/2001 | Zickell .................... 428/40.1 |
| 6,444,291 B1 | * | 9/2002 | Phillips et al. ............ 428/143 |
| 6,696,125 B1 | * | 2/2004 | Zanchetta et al. ......... 428/40.1 |
| 2002/0061379 A1 | * | 5/2002 | Zickell et al. ............. 428/40.1 |
| 2002/0076525 A1 | * | 6/2002 | Fensel et al. .............. 428/150 |
| 2005/0204675 A1 | * | 9/2005 | Snyder et al. ............. 52/555 |

FOREIGN PATENT DOCUMENTS

CA 2 487 747 * 5/2005

OTHER PUBLICATIONS

Hawley's Condensed Chemical Distinary, Lewis, 1997, John Wiley & Sons, Inc., 13, 904, 905.*

* cited by examiner

*Primary Examiner*—Robert Canfiled
(74) *Attorney, Agent, or Firm*—Bereskin & Parr

(57) ABSTRACT

A shingle formed from a base sheet, with a layer of polymer modified asphalt coating the top of the base sheet, and a layer of conventional oxidized asphalt, free from polymer additives, coating the bottom of the base sheet. Both layers preferably directly contact the strands of the base sheet for good adhesion. This improves the strength, flexibility and ultraviolet resistance of the shingle, while reducing the cost as compared with a shingle which utilized only polymer modified asphalt, and in addition it increases the stiffness of the shingle as compared with one using only polymer modified asphalt.

9 Claims, 2 Drawing Sheets

DUAL LAYER SHINGLE

FIELD OF THE INVENTION

This invention relates to asphalt-based roofing shingles for use on the roofs of buildings.

BACKGROUND OF THE INVENTION

Asphalt-based roofing shingles are commonly made by taking a continuous base sheet which may be of organic felt, or fiberglass mat, covering both sides of the base sheet with a coating asphalt, and then embedding granules on the top side of the coated sheet. The granules protect the asphalt from breaking down through oxidation caused by ultraviolet rays. The finished sheet is cut into lanes and then into desired lengths for shingles.

Since conventional oxidized asphalt which is normally used for roofing shingles has limited strength and life, and can be brittle, it has become common to use a form of asphalt which is referred to as "modified asphalt" for roofing shingles. Modified asphalt has an elastomeric polymer blended with ordinary asphalt. The elastomeric polymer imparts elasticity and greater strength to the asphalt and also improves its resistance to ultraviolet rays.

However, a disadvantage of modified asphalt is that it is extremely expensive as compared with ordinary oxidized asphalt. Therefore, for economic reasons the use of modified asphalt in roofing shingles has been relatively limited. In addition, roofing shingles which use modified asphalt may often be too flexible and can therefore be difficult to apply to a roof. Further, because of their lack of stiffness they may tend to bend upwardly in a strong wind, increasing the likelihood (despite their greater strength) that they may eventually break.

BRIEF SUMMARY OF THE INVENTION

The invention provides shingles which, although they incorporate some modified asphalt, also utilize some oxidized asphalt, and are therefore less costly than shingles which utilize only modified asphalt. In addition, the shingles of the invention tend to be stiffer than those which use solely modified asphalt. The stiffer shingles are easier to apply.

In one aspect, the invention provides a shingle comprising a base sheet having a plurality of fibers, said base sheet having a top and a bottom, an upper layer of asphalt over at least a portion of said top, a lower layer of asphalt under said bottom, at least one of said layers coating said base sheet, said upper layer comprising a blend of asphalt and elastomeric polymer, said lower layer comprising an oxidized asphalt substantially free from elastomeric polymer additives, said upper layer contacting said lower layer.

In another aspect, the invention provides a method of making a shingle comprising: selecting a base sheet comprising a plurality of fibers, said base sheet having a top and a bottom, applying a first layer of asphalt coating over said top of said base sheet and a second layer of asphalt coating under said bottom of said base sheet, at least one of said layers coating said base sheet, said first layer comprising a blend of asphalt and an elastomeric polymer, said second layer comprising oxidized asphalt substantially free from elastomeric polymer additives, said first and second layers contacting each other.

BRIEF DESCRIPTION OF DRAWINGS

The invention will be better understood from the following description, taken with the accompanying drawings, in which.

DETAILED DESCRIPTION OF PREFERRED EMBODIMENTS

Figure 1:
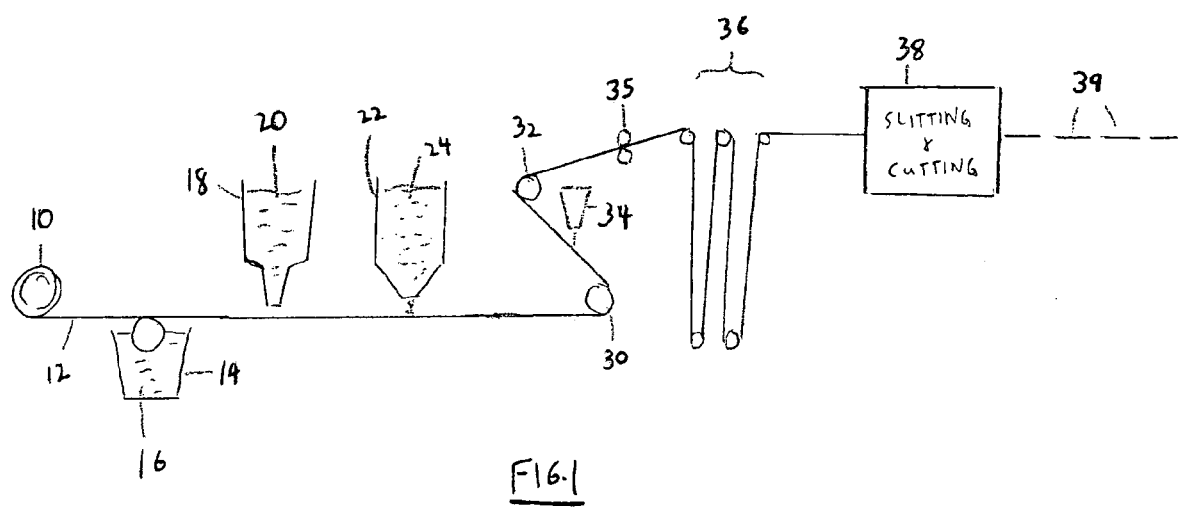
FIG. 1 is a diagrammatic view of a production line or shingles according to the invention.

Reference is first made to FIG. 1, which shows a production line for shingles. The production line shown in FIG. 1 is conventional and therefore is described only briefly.

As shown, the production line includes a roll 10 of fiberglass mat or organic felt (normally the roll 10 will be fiberglass mat). A sheet 12 is unrolled from the roll 10 and passed over a conventional coater 14 containing conventional oxidized asphalt 16. The coater 14 coats the bottom of the sheet 12 with the oxidized asphalt 16.

The sheet 12 then passes beneath a top coater 18, which coats the top of the sheet 12 with modified asphalt 20. The differences between the modified asphalt 20 and the conventional asphalt 16 will be described below.

The sheet 12, now coated on both sides, next passes beneath a granule applicator indicated at 22, where granules 24 are applied to the top surface of the sheet 12. The sheet 12 then passes through rollers 30, 32 allowing the bottom surface of the sheet to be coated with a parting material such as talc, at station 34. The sheet 12 then passes through rollers 35 which press the granules 24 in place on the sheet, after which the sheet passes through a cooling section 36 and a slitting and cutting section 38 where it is slit into lanes and cut into individual shingles 39. The shingles 39 are stacked and packaged for delivery.

The conventional oxidized asphalt which is used can be any conventional coating asphalt used as a roofing asphalt. Usually, such asphalts have a penetration index from about 50 dmm to about 400 dmm, preferably from about 85 dmm to about 300 dmm, and more preferably from about 85 dmm to about 200 dmm. (As is known, "dmm" means penetration in decimillimeters, which is the amount by which a needle weighted by 100 grams will penetrate the surface of the asphalt in five seconds at 25° C., as defined by standard test ASTM D5.)

Typically, such conventional asphalts also have a softening point, prior to oxidation, from about 25° C. to about 100° C., preferably from about 25° C. to about 50° C., and more preferably from about 25° C. to about 40° C. The softening point is defined by standard test ASTM D36.

The oxidized asphalt is prepared by elevating the temperature of the asphalt and exposing it to oxygen, for example by bubbling air or oxygen through the asphalt. The oxidation increases the softening point of the asphalt while lowering its penetration. The softening point of the oxidized coating asphalt is typically from about 90° C. to 110° C. after it has been oxidized.

The oxidized asphalt used in shingle coating also usually has a quantity of filler material added thereto. The filler material may be any of those which are known in the art, such as finely crushed limestone, slag, traprock or a mixture thereof. The filler extends the asphalt by increasing its volume and thus reducing its cost, and also increases the fire and weathering resistance of the asphalt.

The modified asphalt 20 used on the top surface of the shingle is a blend comprising an elastomeric polymer and an asphalt of the kind described above (not oxidized). The elastomeric polymer may be any of those known in the art to impart elasticity to asphalt. Polymer materials which are suitable for such use include, but are not limited to, natural rubber, synthetic rubber such as butadiene-styrene copolymers including styrene-butadiene-styrene, thermoplastic rubber such as block copolymers of styrene/ethylene-butylene, or a thermoplastic polymer such as atactic polypropylene, or blends of these polymers.

A typical styrene-butadiene-styrene ("SBS") polymer suitable for use in the present invention is that sold by Fina Oil and Chemical Co. of Dallas, Tex. A typical actactic polypropylene which is suitable for use is that sold by Rexene Corp. of Odessa, Tex.

The polymer content of the blend of asphalt and elastomeric polymer will typically be 10% to 12% by weight, based on the total weight of the blend, when SBS is used, and about 22% to 26% by weight, based on the total weight of the blend, when actactic polypropylene is used. However these proportions may vary, depending on the specific polymer or blend of polymers used, the type of asphalt used, and the proportions desired.

A quantity of filler material may be added to the blend of elastomeric polymer and asphalt. The filler material will typically be similar to the filler material used in the oxidized asphalt. Once again, the use of the filler increases the fire resistance of the blend and also extends the blend.

Figure 2:
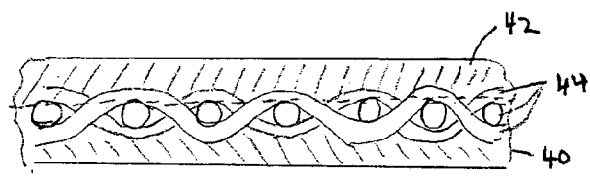
FIG. 2 is a diagrammatic cross-section, enlarged, of a shingle according to the invention before granules have been applied.

FIG. 2 shows the sheet 12 after the sheet has been coated on its bottom and top. The coating of oxidized asphalt is indicated at 40 and the coating of modified asphalt is indicated at 42. The glass fiber strands of the glass fiber sheet are indicated at 44, consisting of warp and weft strands. It is assumed in FIG. 2 that the glass fiber sheet is woven, but it is more usually non-woven, in which case the sheet 12 prior to coating will consist of randomly oriented glass fibers instead of warp and weft strands.

In the embodiment shown, the bottom coating 40 has been applied first, so coating 40 is shown as extending adjacent to (but not coating) the tops of strands 44. The top coating 42 (whether it is applied first or second) is typically thicker than the bottom coating and extends upwardly from the tops of the strands 44. By coating the bottom first (and thus by having the bottom coating extend upwardly through most of the thickness of the sheet 12), the amount of conventional oxidized asphalt used is maximized, reducing the cost of a shingle and also making it stiffer. However, if preferred, the top coating can be applied first (by reversing coaters 14, 18), in which case the top coating will extend closer to the bottom of strands 44. This will use more modified asphalt and less ordinary oxidized asphalt, increasing the cost of the shingle but making it stronger (which is desirable) and more flexible (which in some cases is desirable and in some cases may not be desirable). In both cases, each layer 40, 42 preferably contacts at least some of the strands 44 directly, and does not simply adhere to the other layer. This reduces any tendency for the two layers to delaminate, which might otherwise tend to occur if one coating simply adhered to the other coating. Of course the two layers 40, 42 also directly contact each other.

Figure 3:
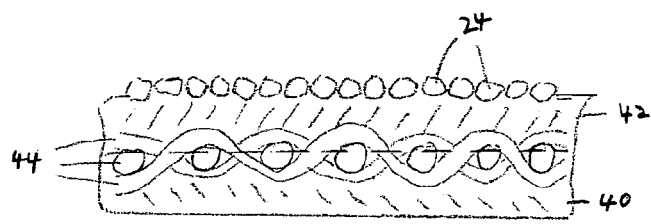
FIG. 3 is a view similar to that of FIG. 2 but with the granules in place on the shingle.

FIG. 3 shows the shingle of FIG. 2 with the granules 24 embedded in the top layer 42. It will be realized that various kinds and colors of granules can be used, to achieve any desired effect.

While two classes of polymer additives have been described, other kinds of polymer additives may be used, as desired. Examples of various kinds of polymer additives which may be used are disclosed in U.S. Pat. No. 5,347,785.

In addition, while the sheet 12 has been described as formed from woven glass fibers, other materials or mixtures of materials can be used in either woven or non-woven form, also as described in U.S. Pat. No. 5,347,785.

Figure 4:
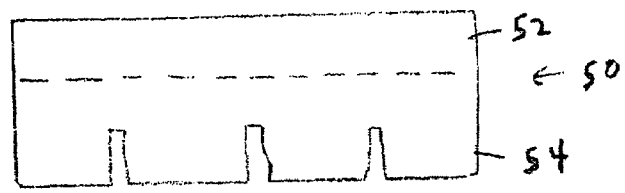
FIG. 4 is a plan view of a completed shingle according to the invention.

Reference is next made to FIG. 4, which shows a conventional shingle 50 in plan view. It will be seen that the shingle 50 includes a headlap portion 52, which, when the shingle is installed on a roof, is normally covered by an adjacent shingle, and an exposed portion 54 which is exposed to the elements. To reduce costs, the upper surface of the headlap portion 52, as well as the entire lower surface of the shingle 50, can be coated of ordinary oxidized asphalt, while only the exposed upper surface of exposed portion 54 is coated with modified asphalt.

Figure 5:
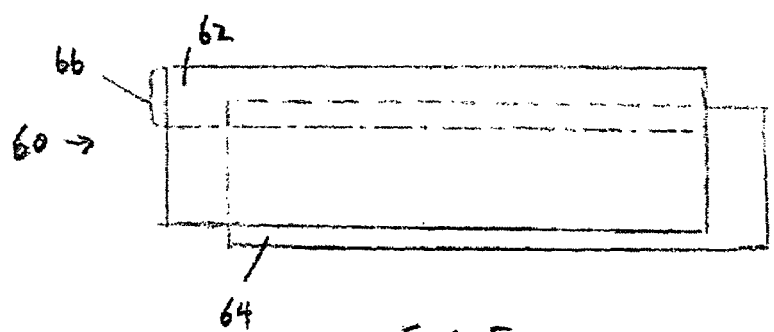
FIG. 5 is a plan view of a multi-layer shingle according to the invention.

The invention is also applicable to multi-layer shingles, for example as shown in FIG. 5 which illustrates a two-layer shingle 60 having a top sheet 62 and a bottom sheet 64. As is well-known, each sheet 62, 64 itself consists of a fiber-based sheet (typically glass fibers) coated top and bottom with asphalt, and having decorative granules applied at least to the exposed portions. Such shingles which may of course have more than two sheets forming multiple layers, are often used for their decorative effect, or for a longer life, or both. In such shingles, where the bottom sheet 64 is almost entirely covered by the top sheet 62, then both the upper and lower surfaces of the bottom sheet may be coated with ordinary oxidized asphalt. Only the portion of the top surface of the top sheet 62 which will be exposed to the elements needs to be coated with modified asphalt. Thus, the headlap portion 66 of the upper sheet 62, and the entire upper surface of the lower sheet 64 (as well as the lower surfaces of both sheets) can be coated with ordinary oxidized asphalt.

Figure 6:
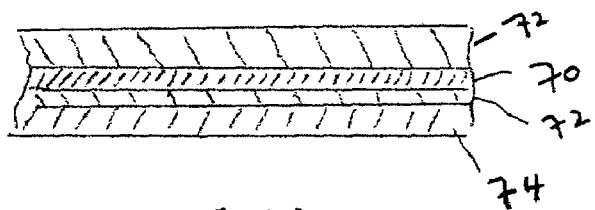
FIG. 6 is a diagrammatic cross-section of a modified shingle according to the invention, before the granules have been applied.
Figure 7:
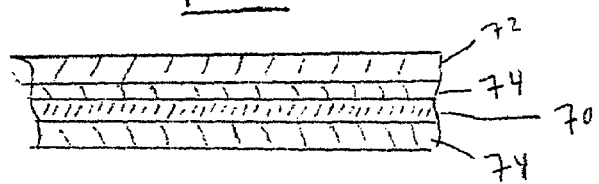
FIG. 7 is a cross-sectional view similar to FIG. 6 but showing a further modification.

Another embodiment of the invention is shown in FIG. 6. In the FIG. 6 embodiment, the fiber base sheet, shown at 70, is again coated with an upper layer 72 of modified asphalt. However, in this case the upper layer 72 extends through the fibers of the base sheet and to a position below the base sheet 70. The bottom surface of the upper layer 72 is coated with ordinary oxidized asphalt 74. This version provides for the use of more modified asphalt, for example where greater flexibility is needed. If desired, the situation can be reversed, as shown in FIG. 7, and the bottom layer 74 of oxidized asphalt can extend from below the base sheet to a position above the top of the base sheet 70, with the upper surface of the oxidized asphalt (located above the base sheet) being coated with modified asphalt. In both cases, as before, granules (not shown) are applied to the upper surface of upper layer 72.

While preferred embodiments of the invention have been described, it will be realized that various changes can be made within the scope of the invention.

I claim:

1. A shingle comprising a base sheet having a plurality of fibers, said base sheet having a top and a bottom, said top having first and second portions, said first portion of said top being an exposed portion which is normally exposed when said shingle is in use, said second portion of said top being a headlap portion which is normally covered by other shingles when said shingle is in use, a first layer of asphalt over said first portion of said top, a second layer of asphalt over said headlap portion of said top, a third layer of asphalt under said bottom, at least one of said layers coating said base sheet, said first layer comprising a blend of asphalt and elastomeric polymer additives, said second and third layers comprising an oxidized asphalt substantially free from elastomeric polymer additives, said first layer contacting said third layer, and a layer of granules embedded in said first layer.

2. A shingle according to claim 1 wherein said base sheet is formed of glass fibers.

3. A shingle according to claim 1 wherein each layer contacts said fibers.

4. A shingle according to claim 1 wherein said third layer of asphalt coats said fibers substantially to the tops of said fibers.

5. A shingle according to claim 1 wherein said first layer of asphalt coats said base sheet and extends below said base sheet, and said third layer of asphalt contacts said first layer but does not contact said base sheet.

6. A shingle according to claim 1 wherein said third layer of asphalt coats said base sheet and extends above said base sheet, and said first layer of asphalt contacts said third layer but does not contact said base sheet.

7. A shingle according to claim 1 wherein said elastomeric polymer is a styrene-butadiene-styrene polymer.

8. A shingle according to claim 1 wherein said elastomeric polymer is an atactic polypropylene polymer.

9. A shingle according to claim 1 and being a multi-layer shingle which further includes a lower base sheet at least a substantial portion of which is covered by said first mentioned base sheet, said lower base sheet having a top and a bottom both of which are coated by an oxidized asphalt substantially free from elastomeric polymer additives.

* * * * *